(12) United States Patent
Merugu et al.

(10) Patent No.: US 8,606,564 B2
(45) Date of Patent: Dec. 10, 2013

(54) EXTRACTING RICH TEMPORAL CONTEXT FOR BUSINESS ENTITIES AND EVENTS

(75) Inventors: Srujana Merugu, Gurgaon (IN); Sathiya Keerthi Selvaraj, Cupertino, CA (US); Vipul Agarwal, Hyderabad (IN); Arup Kumar Choudhury, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 389 days.

(21) Appl. No.: 12/917,389

(22) Filed: Nov. 1, 2010

(65) Prior Publication Data

US 2012/0109637 A1 May 3, 2012

(51) Int. Cl.
*G06F 17/27* (2006.01)
*G06F 17/30* (2006.01)

(52) U.S. Cl.
USPC .............................................. 704/9; 707/709

(58) Field of Classification Search
None
See application file for complete search history.

(56) References Cited

U.S. PATENT DOCUMENTS

| | | | | |
|---|---|---|---|---|
| 6,714,939 | B2* | 3/2004 | Saldanha et al. | 1/1 |
| 7,730,013 | B2* | 6/2010 | Dill et al. | 707/715 |
| 2005/0149858 | A1* | 7/2005 | Stern et al. | 715/513 |
| 2006/0047500 | A1* | 3/2006 | Humphreys et al. | 704/9 |
| 2008/0140384 | A1* | 6/2008 | Landau | 704/9 |
| 2010/0082331 | A1* | 4/2010 | Brun et al. | 704/9 |

OTHER PUBLICATIONS

Negri et al., "Recognition and Normalization of Time Expressions: ITC-irst at TERN 2004", TERN 2004 Evaluation Workshop, 2004.*
Vernhagen et al., "The TempEval challenge: identifying temporal relations in text", Language Resources and Evaluation, vol. 43, No. 2, pp. 161-179, 2009.*
Kolomiyets et al., "KUL: Recognition and Normalization of Temporal Expressions", SemEval '10 Proceedings of the 5th International Workshop on Semantic Evaluation, pp. 325-328, Jul. 15-16, 2010.*
Pustejovsky et al., "Temporal and Event Information in Natural Language Text", Language Resources and Evaluation, vol. 39, pp. 123-164, 2005.*
Strotgen et al., "HeidelTime: High Quality Rule-based Extraction and Normalization of Temporal Expressions", Proceedings of the 5th International Workshop on Semantic Evaluation, ACL 2010, pp. 321-324, Jul. 15-16, 2010.*

(Continued)

*Primary Examiner* — Brian Albertalli
(74) *Attorney, Agent, or Firm* — Weaver Austin Villeneuve & Sampson LLP (57) ABSTRACT

Methods and apparatus for performing computer-implemented extraction of temporal information for business entities and events are disclosed. In one embodiment, a sequence of text is obtained. A label is assigned to one or more of a plurality of segments of the text such that each of the one or more of the plurality of segments of the text is classified as temporal data in one of a plurality of classes of temporal data. One or more rules are applied to the one or more segments of the text that have been classified as temporal data to generate a structured representation of the temporal data, where the rules include one or more schematic rules. Each of the schematic rules pertains to one or more of the plurality of classes of temporal data and indicates a structure in which temporal data in the corresponding one or more of the plurality of classes is to be stored.

23 Claims, 9 Drawing Sheets

(56) References Cited

OTHER PUBLICATIONS

UzZaman et al., "TRIPS and TRIOS System for TempEval-2: Extracting Temporal Information from Text", Proceedings of the 5th International Workshop on Semantic Evaluation, ACL 2010, pp. 276-283, Jul. 15-16, 2010.*

Pustejovsky et al., "SemEval-2010 Task 13: Evaluating Events, Time Expressions, and Temporal Relations (TempEval-2)", Proceedings of the NAACL HLT Workshop on Semantic Evaluations: Recent Achievements and Future Directions, pp. 112-116, Jun. 2009.*

Mingli et al., "CTEMP: A Chinese Temporal Parser for Extracting and Normalizing Temporal Information", Natural Language Processing—IJCNLP 2005, vol. 3651, pp. 694-706, 2005.*

UzZaman et al., "Extracting Events and Temporal Expressions from Text," Semantic Computing (ICSC), 2010 IEEE Fourth International Conference on, vol., no., pp. 1-8, Sep. 22-24, 2010.*

Bo Yuan et al., "Extracting Event Temporal Information Based on Web," Knowledge Acquisition and Modeling, 2009. KAM '09. Second International Symposium on, vol. 1, no., pp. 346-350, Nov. 30, 2009-Dec. 1, 2009.*

"The Stanford Parser: A statistical parser" http://nlp.stanford.edu/software/lex-parser.shtml (5 pages), Available since 2004. www.archive.org.

* cited by examiner

| Source | Relationship | Target | Cardinality |
|---|---|---|---|
| temporal-event | contains/exclusion | temporal-event | many-many |
| | name/src-content | string | many-1 |
| | src-id | blob id string | 1-1 |
| | +vc rule/-vc rule | time rule entity | 1-many |
| time-rule | start/end | time-stamp | 1-1 |
| | periodicity | time-period | 1-1 |
| | rule start/end | time-stamp | 1-1 |
| | nested rule | time-rule | 1-many |
| time-stamp | year/month dayOfMonth dayOfWk/hr/min | integer includes NULL | many-1 |
| time-period | year/month/week day/hr/min | integer includes NULL | many-1 |

*Time Entity and Time range:*
```
TIME_ENTITY ::=
    TIME:t TIME_ZONE:tz TIME:t |
    HTML_START_TAG TIME_ENTITY:t HTML_END_TAG TIME_KEY_WORD:tk |
    NUMERIC_2:t | TIME:t TIME_KEY_WORD:tk | NUMERIC_1:t TIME_RANGE ::=
    TIME_ENTITY:te1 RANGE_SEPARATOR TIME_ENTITY |
    SEPARATOR:sep TIME_ENTITY:te |
    RANGE_SEPARATOR:sep TIME_ENTITY |
    TIME_ENTITY:te1 HTML_EVENT RANGE_SEPARATOR TIME_ENTITY: |
    TIME_ENTITY:te1 RANGE_SEPARATOR HTML_QUALIFIER:qua |
    TIME_RANGE_KEY_WORD:tk
```

*Day Entity and Day Range*
```
DAY_SET ::= DAY_OF_WEEK:d | DAY_RANGE:dr | DAY_KEY_WORD:dkw HTML_DAY_RANGE ::=
    HTML_DAY_RANGE:ds HTML_START_TAG |
    HTML_DAY_RANGE:ds HTML_END_TAG |
    HTML_DAY_RANGE_CONJUN:ds HTML_DAY_RANGE:dr1 |
    HTML_DAY_RANGE_CONJUN:ds |
    INSERTED_DAY_OF_WEEK : dr | DAY_SET:ds
```

*Event related expression*
```
EVENT_SET_EXPR ::=
    EVENT_SET_TERM:est CONJUNCTION_TERM EVENT_SET_EXPR:ese |
    EVENT_SET_TERM:est EVENT_SET_TERM ::= EVENT_SET_FACTOR:esf EVENT_SET_TERM:est |
                   EVENT_SET_FACTOR:

HTML_EVENT_SET_EXPR ::=
    HTML_START_TAG HTML_EVENT_SET_EXPR:ese HTML_END_TAG |
    EVENT_SET_EXPR:ese HTML_START_TAG | EVENT_SET_EXPR:ese
```

*Event and time association*
```
EVENT_TIME_SET ::=
    HTML_EVENT_SET_EXPR:ese TIME_SET:tse |
    HTML_EVENT_SET_EXPR:ese HTML_END_TAG TIME_SET:ts |
    HTML_EVENT_SET_EXPR:ese HTML_START_TAG TIME_SET:ts |
    HTML_EVENT_SET_EXPR TIME_SET HTML_DAY_SET_EXPR TIME_SET |
    HTML_EVENT_SET_EXPR:ese TIME_ENTITY:te |
    TIME_ENTITY:te | TIME_SET:ts
```

*Day Event Time expression*
```
DAY_EVENT_TIME_EXPR ::=
    DAY_EVENT_TIME_TERM:dett CONJUNCTION_TERM
    DAY_EVENT_TIME_EXPR:dete |
    EVENT_TIME_SET_EXPR:ets HTML_MULTI_DAY_SET_TERM:mdst |
    EVENT_DAY_TIME_3A_EXPR:dett |
    DAY_EVENT_TIME_EXPR_2A:dett DAY_EVENT_TIME_EXPR:dete |
    DAY_EVENT_TIME_EXPR:dett DAY_EVENT_TIME_EXPR_2A:dete |
    DAY_EVENT_TIME_EXPR:dett EVENT_TIME_SET_EXPR:ets |
    DAY_EVENT_TIME_TERM:dett
```

EXTRACTING RICH TEMPORAL CONTEXT FOR BUSINESS ENTITIES AND EVENTS

BACKGROUND OF THE INVENTION

The present invention relates generally to computer implemented extraction of temporal information pertaining to business entities and events.

There currently exist a number of applications that make use of geographical location. For instance, online web-search engines are often invaluable for searching for a location of a business or directions to a particular business. However, very few applications exploit temporal context.

Unfortunately, information pertaining to temporal properties of entities such as hours of operation of business organizations and event timings is often unstructured and difficult to parse. As a result, it is typically difficult to extract temporal information so that it is machine-understandable. On the other hand, leveraging information on the Internet has become even more vital due to the popularity of mobile Internet-enabled devices.

SUMMARY OF THE INVENTION

Methods and apparatus for extracting temporal context for business entities and events are disclosed. The disclosed embodiments may be applied to blobs of content obtained from a file or website. Once extracted, the temporal information may be used in a variety of applications including, but not limited to, online web-search engines.

In order to simplify the following description, the term "text" will be used to refer generally to one or more characters or symbols. Therefore, text may include content from a file or website (e.g., HTML content). Moreover, a blob may be referred to as a sequence of text.

In accordance with one aspect, a sequence of text may be parsed using a variety of methods or mechanisms. After parsing is performed, labeling may be performed on the parsed sequence of text in order to more easily identify temporal information within the sequence of text. The temporal information may be structured and/or stored using a set of schematic rules. The term "schematic rules" is used generally to refer to mechanisms and/or formats for generating a structured representation and are not intended to refer to a specific format or implementation.

In accordance with another aspect, the schematic rules that are used to generate a structured representation of the temporal data may be implemented in a variety of manners. In accordance with one embodiment, the schematic rules that are used to generate a structured representation of the temporal data may be implemented, at least in part, via a schema that defines object types (e.g., temporal entities) and relationships between the object types.

In accordance with another aspect, a sequence of text is parsed into a plurality of segments of text. A segment of text may include one or more textual characters or symbols. A label may be assigned to one or more of a plurality of segments of the text such that each of the one or more of the plurality of segments of the text is classified as temporal data in one of a plurality of classes of temporal data. One or more rules including one or more schematic rules (i.e., schematic or temporal entities) may be applied to the one or more segments of the text that have been classified as temporal data to generate a structured representation of the temporal data, where each of the schematic entities pertains to one or more of the plurality of classes of temporal data and indicates a structure in which temporal data in the corresponding one or more of the plurality of classes is to be stored.

In accordance with another aspect, a label may be assigned to one or more of the plurality of segments of text using a variety of parsing and labeling mechanisms or algorithms. In accordance with one embodiment, a sequence of text is parsed into a sequence of a plurality of tokens. Each of the tokens may include a segment of text (which may include an HTML tag). A label (e.g., terminal label) may then be assigned to one or more of the plurality of tokens, wherein the label assigned to each of the one or more of the plurality of tokens classifies the corresponding token as temporal data in one of a plurality of classes of temporal data. Of course, it is also possible to label one or more of the plurality of tokens as not corresponding to temporal data. One or more of the plurality of segments of the text (e.g., or corresponding tokens) that cannot be classified as one of the plurality of classes of temporal data may therefore be eliminated without being further processed or formatted.

In accordance with yet another aspect, the schematic entities may be applied by first creating a parse tree including the one or more of the plurality of segments of the text (or corresponding tokens) that have been classified as temporal data. The parse tree may then be traversed to convert the temporal data in the parse tree into a structured representation of the temporal data using the schematic entities (e.g., schema).

In accordance with one embodiment, leaf nodes (i.e., terminal nodes) of the parse tree may be labeled with terminal labels. Sets of the labeled tokens may be further classified and assigned non-terminal labels to represent more complex temporal concepts at a first intermediate level of the parse tree. Similarly, further, upper intermediate levels may be assigned non-terminal labels to represent additional complexities in temporal concepts. Thus, intermediate nodes of the parse tree may be labeled with a non-terminal label (e.g., a temporal concept label). In some embodiments, various non-terminal labels may identify one or more schematic entities. As the parse tree is traversed (e.g., in a bottom-up manner), the pertinent schematic entities may be instantiated to generate objects for storing the temporal information. Thus, the structured representation may include one or more objects. The structured representation may be stored in association with an entity such as a business organization or event. The temporal data (or any of its transformations) may subsequently be retrieved from the structured representation (or any of its transformations) for use by a variety of applications.

In accordance with yet another aspect, the schema may include or otherwise implement one or more schematic entities. Stated another way, the schema may specify object types (e.g., corresponding with temporal entities) and relationships among the object types. The schematic entities may include one or more positive time-rule entities which describe time periods pertaining to the entity and/or one or more negative time-rule entities which describe time periods that do not pertain to the entity. The schematic entities may be hierarchical in nature, allowing the schematic entities to be "nested." More particularly, a first schematic entity may be applied to temporal data satisfying a second schematic entity.

In accordance with another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 6 is a diagram illustrating example grammar production rules that may be applied to generate a parse tree in accordance with various embodiments.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Temporal information is often widely sought by users, but difficult to obtain. The results of a query for a particular business will often not provide the hours of operation. This poor coverage is because such temporal information is often not available in the manually generated yellow-page style feeds that drive most local search engines. Even when available, there is a high chance of such information being outdated due to its relatively dynamic/seasonal nature, e.g., summer hours are different from winter hours. However, the correct information is often only a few clicks away and readily available on the public web sites of the businesses or event venues. The challenge is to parse the unstructured blob of information in order to convert it into a structured form suitable for querying.

The disclosed embodiments enable temporal information within a blob (e.g., body of text in binary form) to be accurately extracted and converted into a structured format, enabling the temporal information to be used by various applications. Temporal information may include information pertaining to the timing of events, hours of operation of businesses or organizations, posting dates of articles or artifacts, program schedules, etc.

In accordance with various embodiments, temporal information may be extracted and provided by search engines in response to queries having a temporal context, such as "What restaurants are open in San Francisco now?" or "When is the contemporary art museum in New York open?" An example system via which queries may be submitted will be further described with reference to FIG. 1.

Figure 1:
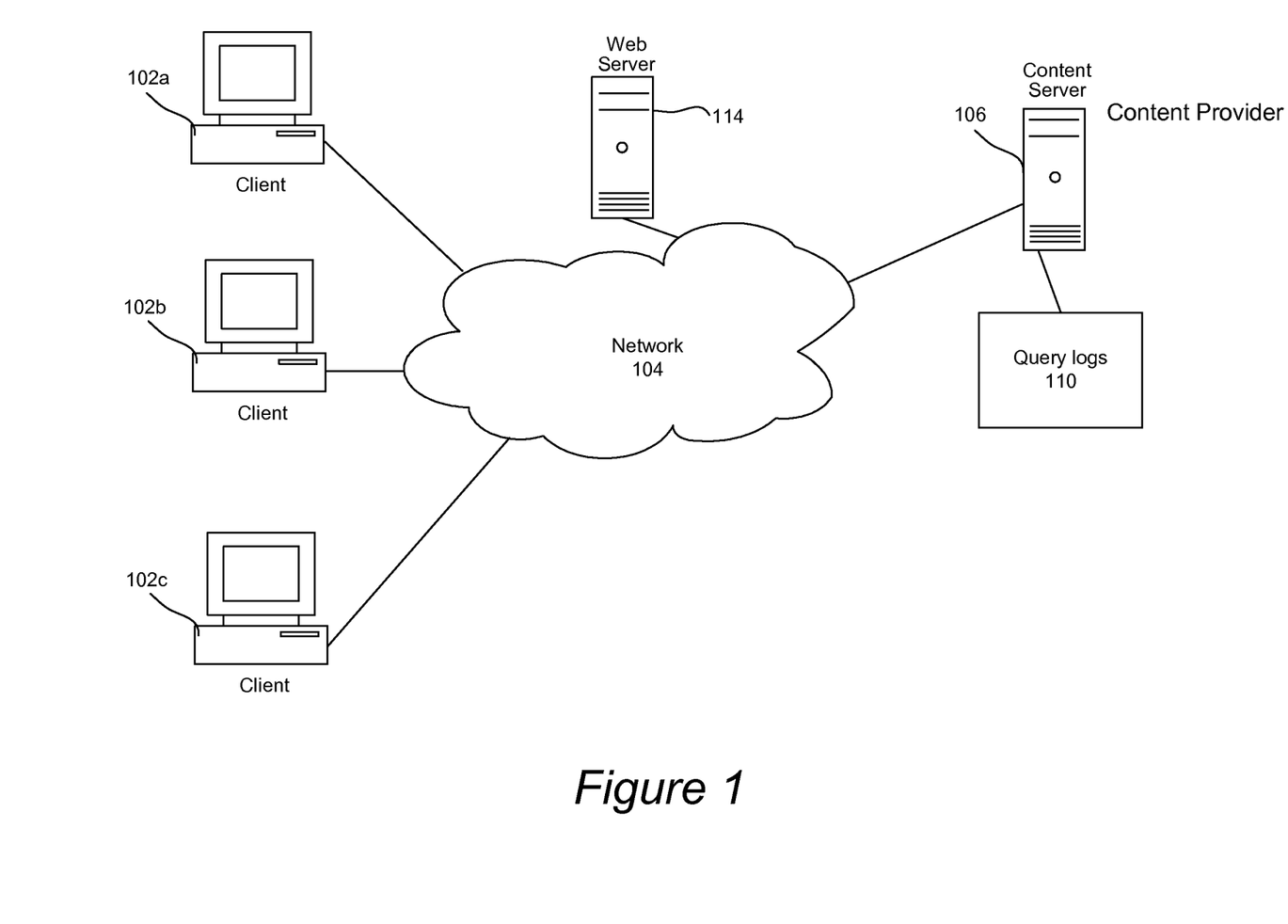
FIG. 1 is a block diagram illustrating an example system in which various embodiments may be implemented.

FIG. 1 illustrates an example network segment in which various embodiments of the invention may be implemented. As shown, a plurality of clients 102*a*, 102*b*, 102*c* may access a search application, for example, on search server 106 via network 104 and/or access a web service, for example, on web server 114 via a graphical user interface, as will be described in further detail below. The network may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104 including, for example, TCP/IP-based networks, telecommunications networks, wireless networks, etc. In addition, the computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is accessible via network 104 and related to a search query including one or more search terms. The search terms may be entered by a user in any manner. Typically, a search website presents a graphical user interface to a client so that the client can enter a search query. For example, a user can enter a query including one or more search term(s) into an input feature of a graphical user interface presented via a search web page and then initiate a search based on such entered search term(s). In response to the query, a web search engine generally returns an ordered list of search result documents.

More particularly, each time a user performs a search on one or more search terms, information regarding such search may be retained in the query logs 110. For instance, the user's search request may contain any number of parameters, such as user or browser identity and the search terms, which may be retained in one or more query logs 110. Additional information related to the search, such as a timestamp, may also be retained in the query logs 110 along with the search request parameters. When results are presented to the user based on the entered search terms, parameters from such search results may also be retained in the query logs 110. For example, the specific search results, such as the web sites, the order in which the search results are presented, whether each search result is a sponsored or algorithmic search result, the owner (e.g., web site) of each search result, whether each search result is selected (i.e., clicked on) by the user (if any), and/or a timestamp may also be retained in the query logs 110. The query logs 110 may be retained in one or more memories that are coupled to the search server 106.

In accordance with various embodiments, upon receiving a search query having a temporal context, the search server 106 may identify the appropriate temporal information and provide the temporal information in response to the query. The temporal information may be extracted dynamically from one or more web sites in real-time. Alternatively, the temporal information supplied in various web sites or associated with various entities may be extracted and stored for subsequent retrieval (e.g., upon receiving a search query or for use in various applications). More particularly, the temporal information may be stored in a data structure. The temporal information (or any of its transformations) may subsequently be retrieved from the data structure (or any of its transformations). In other words, the temporal information may be stored in a data structure, from which the temporal information or a portion thereof may be stored in a second data structure (where the temporal information is stored in the same or a different format).

The temporal information provided on web sites is typically unstructured and provided in varied presentation formats. Therefore, in order to identify, parse, and convert the temporal information into a suitable structured format, a schema may be implemented, as will be described in further detail below. More particularly, the schema may be used to convert unstructured temporal information into a structured format. This may be accomplished through the labeling of text using a plurality of classes, enabling the schema to be applied. The schema, classes, and any other associated files or instructions may be stored in one or more memories coupled to the search server 106.

Embodiments disclosed herein may be implemented via the search server (or other server) 106 and/or the clients 102a, 102b, 102c. For example, various features may be implemented via a web browser and/or application on the clients 102a, 102b, 102c. The disclosed embodiments may be implemented via software and/or hardware.

Figure 2A:
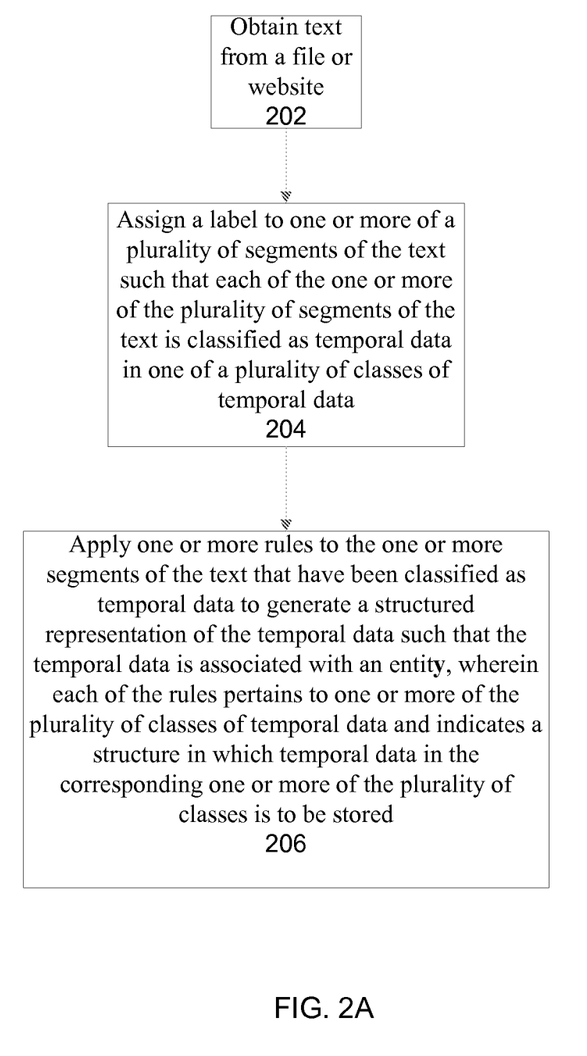
FIG. 2A is a process flow diagram illustrating an example method of extracting temporal content from a file or website in accordance with various embodiments.

FIG. 2A is a process flow diagram illustrating an example method of extracting temporal content from a file or website. More particularly, a sequence of text may be obtained from a file or website at 202. The sequence of text may be parsed into a plurality of segments of text. More particularly, the sequence of text may be parsed into a sequence of tokens. The plurality of segments of text (or corresponding token(s)) may then be identified and labeled according to various classes. More particularly, a label (e.g., terminal label) may be assigned to one or more of a plurality of segments of the text (or corresponding token(s)) at 204 such that each of the one or more of the plurality of segments of the text (or corresponding token(s)) is classified as temporal data in one of a plurality of classes of temporal data. In addition, one or more other segment(s) of the text (or corresponding token(s)) may be labeled as a member of a class that does not correspond to temporal data.

Classes of temporal data may include, but are not restricted to, classes such as "YEAR," "MONTH," "DAY_OF_MONTH," DAY_OF_WEEK" or "TIME_OF_DAY," where each class may correspond to a plurality of words (e.g., set of one or more tokens). For instance, the "DAY_OF_WEEK" class may correspond to the words (i.e., tokens) Monday, Tuesday, Wednesday, Thursday, Friday, Saturday, and Sunday, as well as any abbreviations (e.g., Mon, Tues, etc.). Furthermore, the classes of temporal data may include a "QUALIFIERS" class, which may include the tokens dinner, lunch, room service, bar, etc. Similarly, the classes of temporal data may include a "PUNCTUATION_RANGE_SEPARATORS" class, which may include tokens such as through, to, from, -, etc. Classes that do not correspond to temporal data may include SUPPORT_WORDS and GENERIC_PUNCTUATION. For example, the class SUPPORT_WORDS may include words (i.e., tokens) such as "hours" or "days," while the class GENERIC_PUNCTUATION may include tokens representing punctuation such as ":" or ".". Therefore, a bag of words model may be used to accomplish the assigning of terminal labels according to various classes using regular expressions.

In accordance with various embodiments, a label (e.g., terminal label) may be modified or assigned, at least in part, based upon a context of the corresponding segment of text (or token(s)) within the sequence of text. More particularly, a preprocessing step may ensure that parsing errors in later stages are prevented. For example, for processing dates such as "13 th May", "th" may be labeled as a "SUFFIX." As another example, "th" may also be used as a "DAY_OF_WEEK" in the example "M-Th 8 am-10 am." Thus, depending on the context of the labeled text, we can assign a different label or modify a label that has already been assigned.

Another example of a case in which preprocessing may be applied is in the formatting of an html table, For example, where days are in one row of the table and the hours are in a second row, the corresponding html sequence will appear "Monday Tuesday Wednesday Thursday Friday Saturday Sunday 11:00 am-9:00 pm 11:00 am-9:00 pm 11:00 am-9:00 pm 11:00 am-9:00 pm 11:00 am-9:00 pm 11:00 am-9:00 pm 11:00 am-8:00 pm." In this case, preprocessing can identify the HTML table structure and associate the days with the hours correctly.

One or more rules including, but not limited to, schematic rules (i.e., temporal or schematic entities) may be applied to the one or more segments of the text (or corresponding tokens) that have been classified as temporal data at 206 to generate a structured representation of the temporal data. This may be accomplished through the use of a parse tree (or other intermediate representation or data structure), as will be described in further detail below. Those segments of text (or corresponding tokens) that have not been classified as temporal data may be ignored or dropped, and may not be included in the parse tree. The rules that are applied may include schematic rules (i.e., schematic entities or temporal entities) as well as additional rules such as grammar production rules, which will be described in further detail below. Each of the schematic entities of a schema may identify one or more object types and relationships between the object types. In other words, each of the schematic entities may pertain to one or more of the plurality of classes of temporal data and indicate a structure in which temporal data in the corresponding one or more of the plurality of classes is to be stored. For example, each of the schematic rules may correspond to a class that may be instantiated to generate an object for storing temporal data. In this manner, the temporal data may be converted into a structured form that may be associated with an entity and/or any pertinent sub-entities, as well as any qualifier(s). The entity and/or sub-entities may be identified from text on a web site or web page from which the blob has been obtained.

Figure 2B:
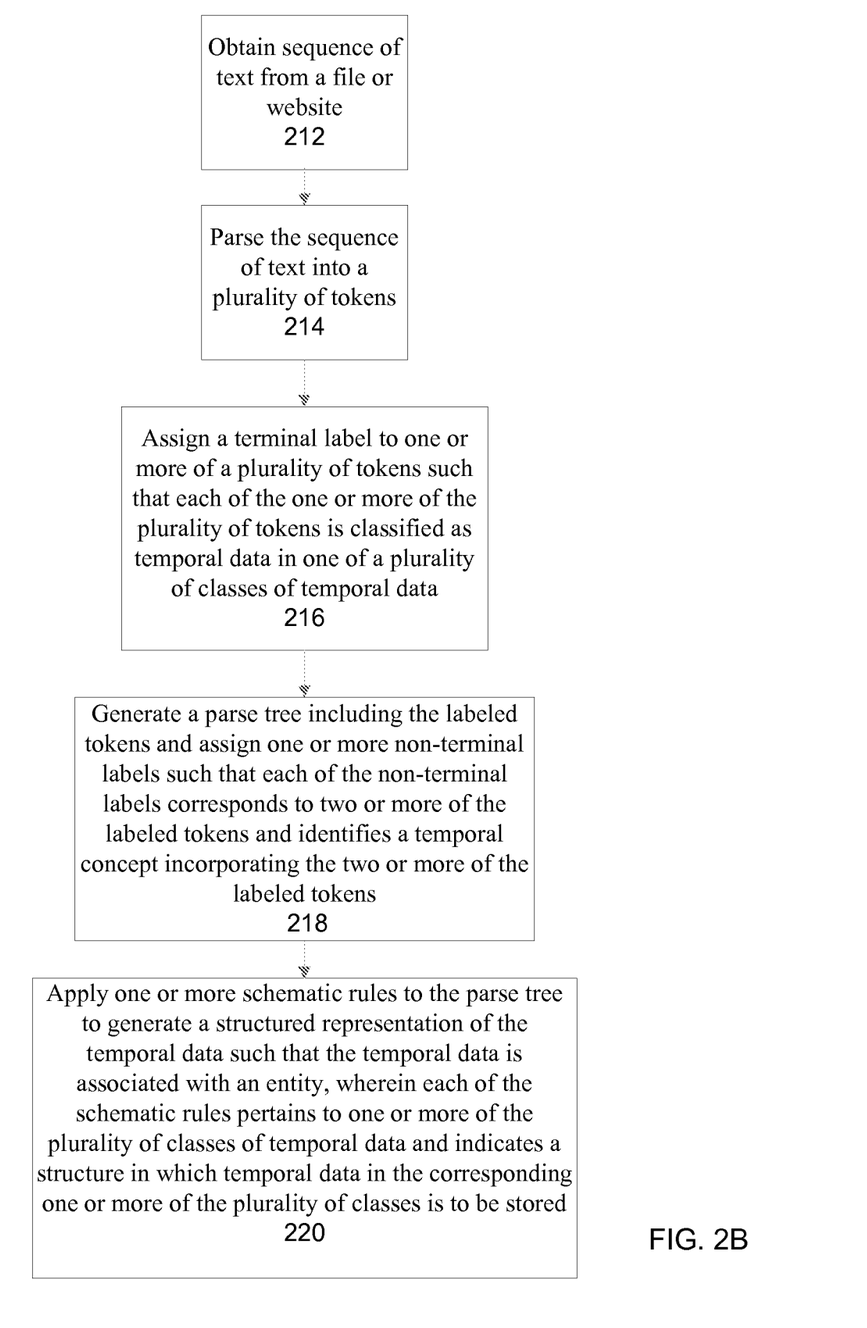
FIG. 2B is a process flow diagram illustrating another example method of extracting temporal content from a file or website in accordance with various embodiments.

FIG. 2B is a process flow diagram illustrating another example method of extracting temporal content from a file or website. More particularly, a sequence of text may be obtained from a file or website at 212. The sequence of text may be parsed into a plurality of tokens at 214. A terminal label may be assigned to one or more of a plurality of tokens such that each of the one or more of the plurality of tokens is classified as temporal data in one of a plurality of classes of temporal data at 216. In addition, one or more other tokens may be labeled as not corresponding to temporal data.

In accordance with one embodiment, a data structure such as a parse tree is generated at 218. This may be accomplished through the application of various grammar production rules, as will be described in further detail below. The parse tree may include the labeled tokens, which may be represented as leaf nodes (i.e., terminal nodes) of the parse tree. In addition, one or more non-terminal labels may be assigned such that each of the non-terminal labels corresponds to two or more of the labeled tokens and identifies a temporal concept (e.g., temporal entity) incorporating the two or more of the labeled tokens. Non-terminal labels may be represented as intermediate nodes (i.e., internal nodes) of the parse tree at one or more levels of the parse tree. In addition, one or more intermediate nodes may represent one or more temporal entities incorporating one or more labeled tokens and/or one or more non-terminal labels. Those segments of text (or corresponding tokens) that have not been classified as temporal data may be ignored or dropped, and may not be included in the parse tree.

One or more schematic entities (i.e., temporal entities) may be applied according to the parse tree to generate a structured representation of the temporal data such that the temporal data is associated with an entity (e.g., business entity), wherein each of the schematic entities pertains to one or more of the plurality of classes of temporal data and indicates a structure in which temporal data in the corresponding one or more of the plurality of classes is to be stored at 220.

Many text blobs that are found on web pages of businesses are incompletely formed. For example one may simply find "Open 7 days 8-11" as the text. Such text is incomplete since it does not specify whether the time period 8-11 refers to the morning or the evening. The method may still return a valid structured representation assuming, for example, 8 and 11 mean morning times by default. However, the accuracy of the representation may be difficult to ascertain.

In accordance with various embodiments, a doubt score that reflects the incompleteness of information in the text may be generated. In the example "Open 7 days 8-11," the doubt score may be higher than in the example "Open Mon-Sat 8 pm-11 pm, Sun 9-12" since, in this second case the doubt may correspond to only one day (Sunday). The doubt score may be calculated or generated based upon various types of incompleteness. For example, the text "Open M-T 8 pm-11 pm" is incomplete because it is unclear if "T" denotes Tuesday or Thursday.

In accordance with various embodiments, a cumulative doubt score may be generated using incompletely formed terminal and non-terminal labels of the parse tree. The structured representation of the temporal data may then be rejected if the doubt score is above a specified threshold. If the doubt score is below the threshold, the resulting structured representation may be accepted. A low threshold may therefore result in filtering out text that is relatively complete, while a high threshold can affect precision. Therefore, the threshold value can be set based on a precision-recall trade off.

Figure 3:
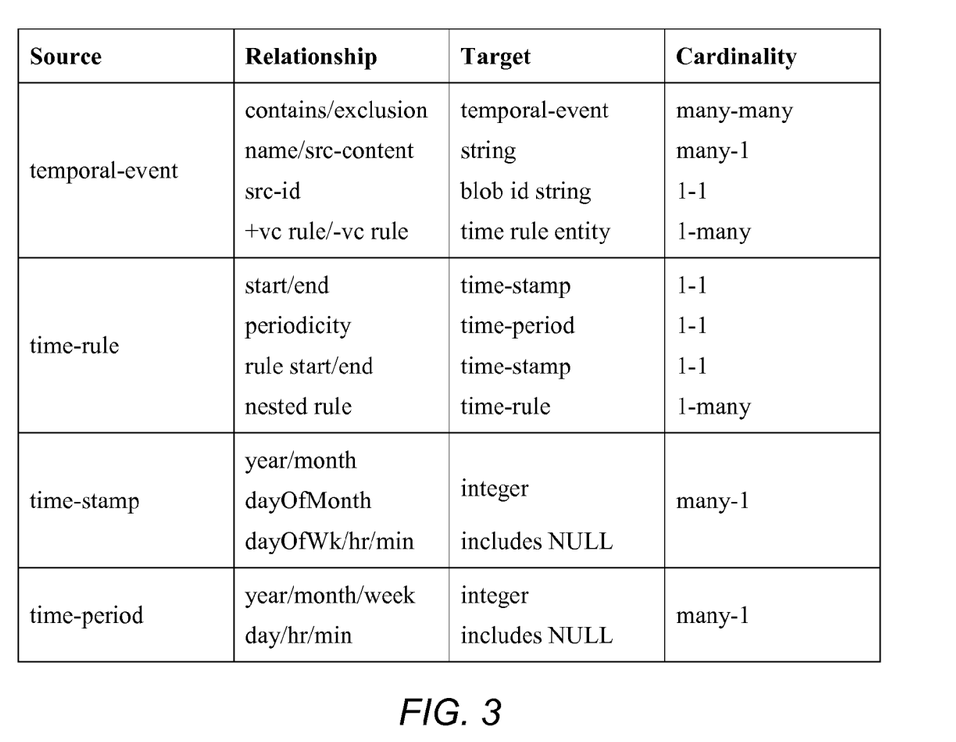
FIG. 3 is a diagram illustrating an example schema that may be applied to generate a structured representation of temporal data in accordance with various embodiments.

FIG. 3 is a diagram illustrating an example schema that may be applied to generate a structured representation of temporal data. The schema may correspond to an entity relationship graph, where each row corresponds to a specific type of relations and the cell entries under the source/destination column (e.g., time-stamp, time-period) corresponds to temporal entities. In this manner, the schema may define relationships between the temporal entities.

In accordance with various embodiments, one or more of the schematic rules (e.g., temporal entities or schematic entities), separately or in combination, may function as a template for storing temporal information. More particularly, one or more of the schematic entities may be instantiated and populated with temporal information to generate a structured representation of the temporal information. The structured representation may be stored to storage. For example, a parse tree may be converted into Extensible Markup Language (XML) for storage.

In this example, four different types of schematic entities are established that may be used separately or in combination with one another to establish a structured representation of temporal information: 1) temporal-event, 2) time-stamp, 3) time-period, and 4) time-rule. The time-stamp entity may be used to represent instants of time. Similarly, the time-period entity may be used to represent a length of a time. The time-rule entity may be used to represent different types of time intervals.

FIG. 3 illustrates the properties of the different types of schematic entities and relationships among the schematic entities (e.g., between "source" and "destination" entities). For instance, the relationships may be inclusive (e.g., where an entity may be nested within another entity) or exclusive (e.g., where an entity cannot be nested within another entity). In addition, each of the entity types may have particular cardinality constraints associated with the "source" and the "target" entities. More particularly, the cardinality may be many-many, many-1, 1-1, and/or 1-many, as shown in FIG. 3.

In this example, the different types of entities are hierarchical in nature. More particularly, a temporal-event entity may contain a time-rule, while a time-rule may contain a time-stamp entity or a time-period entity. Therefore, the schematic entities may be "nested" to generate a structured representation of temporal information. This recursive structure is flexible enough to accommodate fairly complex temporal information such as bus schedules.

As shown in FIG. 3, a temporal-event rule (i.e., entity) may contain or exclude a temporal event. In this example, there is a natural hierarchy among the different temporal entities. More particularly, a temporal event entity may be defined by a name or source content string and/or a source identifier string (blob id string). A temporal aspect of a temporal-event may be captured via one or more positive and/or negative time schematic entities, which respectively describe the time period(s) during which the event happens or does not happen (or during which an establishment is open or closed). The cardinality for the specified relationships between a temporal-event entity and the targets temporal-event, string, blob id string, and time entity may be many-many, many-1, 1-1, and 1-many, respectively.

A time-rule entity may capture a series of one or more time intervals via a parameterized start and end time for the interval(s), periodicity, and/or also a start and end time for the applicability of the rule, i.e., the series itself. Start and end times may be designated by a time-stamp entity, while a periodicity may be designated by a time-period entity. To carve out additional intervals within these intervals, there is a provision for optional time-rule entities nested within each other. More particularly, in this example, a time-stamp entity, a time-period entity, or a time-rule entity may be nested within a time-rule entity. The cardinality for the specified relationships between a time-rule and the targets time-stamp, time-period, time-stamp, and time-rule may be 1-1, 1-1, 1-1, and 1-many, respectively.

Both the time-stamp entity and time-period entity may be used to provide a structured representation for a time stamp or time period, respectively, as shown. A time-stamp or time-period may be represented by year, month, day of the month, day of the week, hour and/or minute.

Example Application of Disclosed Embodiments

Generation of a Parse Tree

A number of methods may be applied to generate a parse tree by assigning non-terminal labels to one or more intermediate nodes of the parse tree. Blobs including temporal information may be treated as natural language for purposes of parsing the blobs. Thus, in accordance with various embodiments, probabilistic context free grammars (PCFG) that provide a distribution over possible parse trees for a given sentence may be appropriate for such scenarios. A PCFG may be represented as a tuple G=(N, Σ, R, S), where N is a finite set of intermediate concepts, Σ is a finite set of terminal concepts, S is the start symbol and R is a finite set of rule and probability pairs (r; p(r)) where the schematic rules (i.e., entities) r are of the form A=>α with A∈N and α∈(Σ∪N)*.

Since our objective is to extract structured information corresponding to the schema in FIG. 3 from each blob (e.g., body of text), we may instantiate a PCFG model such that the start symbol S represents the body of text and the intermediate nodes in N correspond to labels that can enable interpretation of nesting structures in the text content and facilitate mapping to the temporal schema (e.g., one or more schematic entities). The original vocabulary of the text blob form a natural choice for terminal concepts, but results in a huge learning complexity. To handle this issue, we may transform the text into a sequence of tokens from a limited vocabulary (e.g., Sun) and label the tokens as one of a plurality of time-related classes (e.g., day_of_the_week). This labeling can be achieved using a number of classification methods, such as one based on class-specific lists of words or lists of regular expressions. Specifically, each token may be assigned a terminal label such that the token is contained in a word list or matches the regular expression associated with the class label. For instance, the temporal class day_of_week may include the words Monday, Tuesday, Wednesday, Thursday, Friday, Saturday, and Sunday, as well as variants such as Mon, Tue, Wed, Thu, Fri, Sat and Sun. Using this association, the token "Sun" may be labeled as "day_of_the_week." In this manner, each token may be labeled by identifying the class that corresponds to the token. In certain cases, one might also employ more complex sequential classifiers that make use of additional contextual information in proximity to the token of interest.

Figure 4:
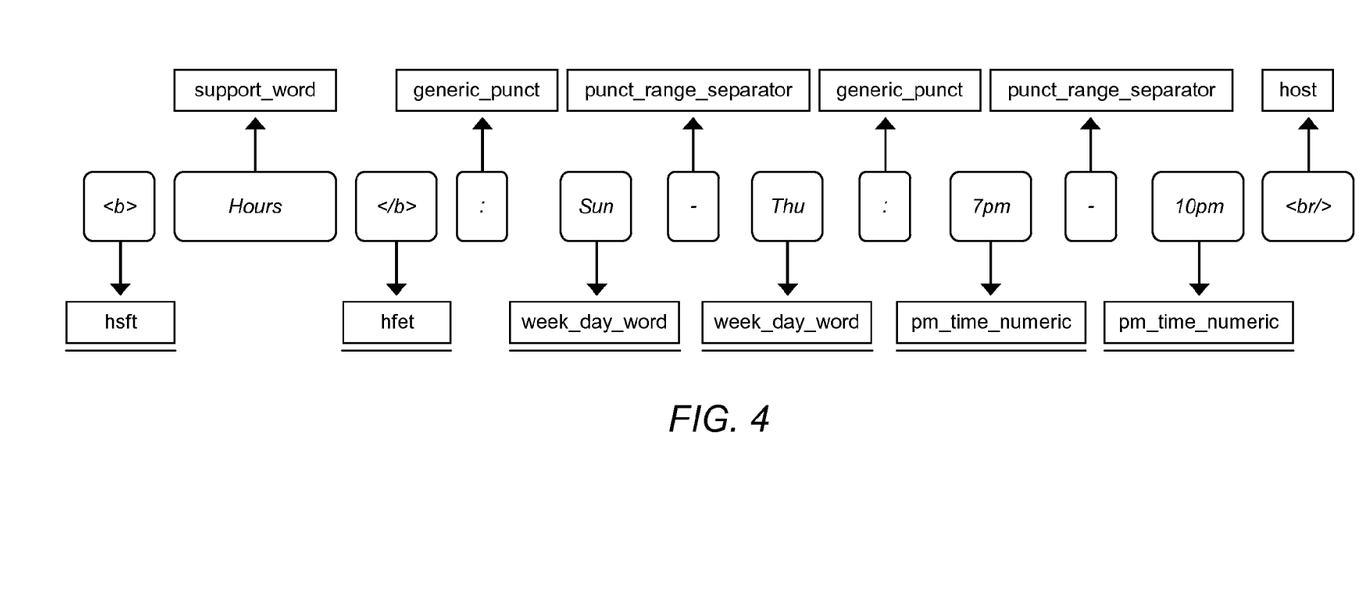
FIG. 4 is a diagram illustrating an example sequence of tokens including the corresponding sequence of terminal labels associated with the tokens generated in accordance with various embodiments.

FIG. 4 is a diagram illustrating an example concept sequence including a labeled token sequence generated in accordance with various embodiments. As shown in this example, a segment of text including temporal information may be converted into tokens and labeled according to corresponding classes. For example, the words "Sun" and "Thur" may be converted to the tokens "Sunday" and "Thursday," respectively. Hypertext markup language (HTML) tags "<b>" and "</b>" may be labeled as shown at "hsft" and "hfet." In addition, "Hours" may be labeled as a support word (support_word), "Sun" and "Thur" may be labeled as a weekday words (week_day_word), "7 pm" and "10 pm" may be labeled as numeric pm times (pm_time_numeric), ":" may be labeled as generic punctuation (generic_punct), and "-" may be labeled as a punctuation range separator (punct_range_separator). Tokens or characters that are not useful can be purged or ignored.

Time-related class names (e.g., day_of_the_week) may constitute a terminal symbol set Σ of the PCFG model. Lastly, the production rules R may include grammar production rules and the associated probabilities may be obtained from editorial annotations using a modification of the well-known inside-outside algorithm implemented as part of Stanford Parser tools. Example grammar production rules will be described in further detail below with reference to FIG. 6. The grammar production rules in R along with the probabilities may constitute a learned PCFG model. The learned PCFG model may then be used by a PCFG-based parsing tool to learn a parse tree with the highest likelihood. More specifically, hierarchical parsing may be performed such that an input token sequence from a previous stage (e.g., lower level of the parse tree) is reduced using a grammar production rule to a pre-defined temporal token or schematic entity (i.e., temporal entity). In other words, a grammar production rule may be applied to a sequence of tokens to reduce the sequence of tokens to the pre-defined temporal token or temporal entity. The predefined temporal token or temporal entity may also be referred to as a temporal concept label.

The node labels (e.g., temporal entities) in the parse tree may then be used to represent the temporal data (e.g., text) in a particular format. More particularly, various internal nodes of the parse tree may denote the pertinent temporal entities to be instantiated. For example, the time 7 pm may be represented as 7 pm or 19:00, and "Sun" may be represented as "Sunday."

Figure 5:
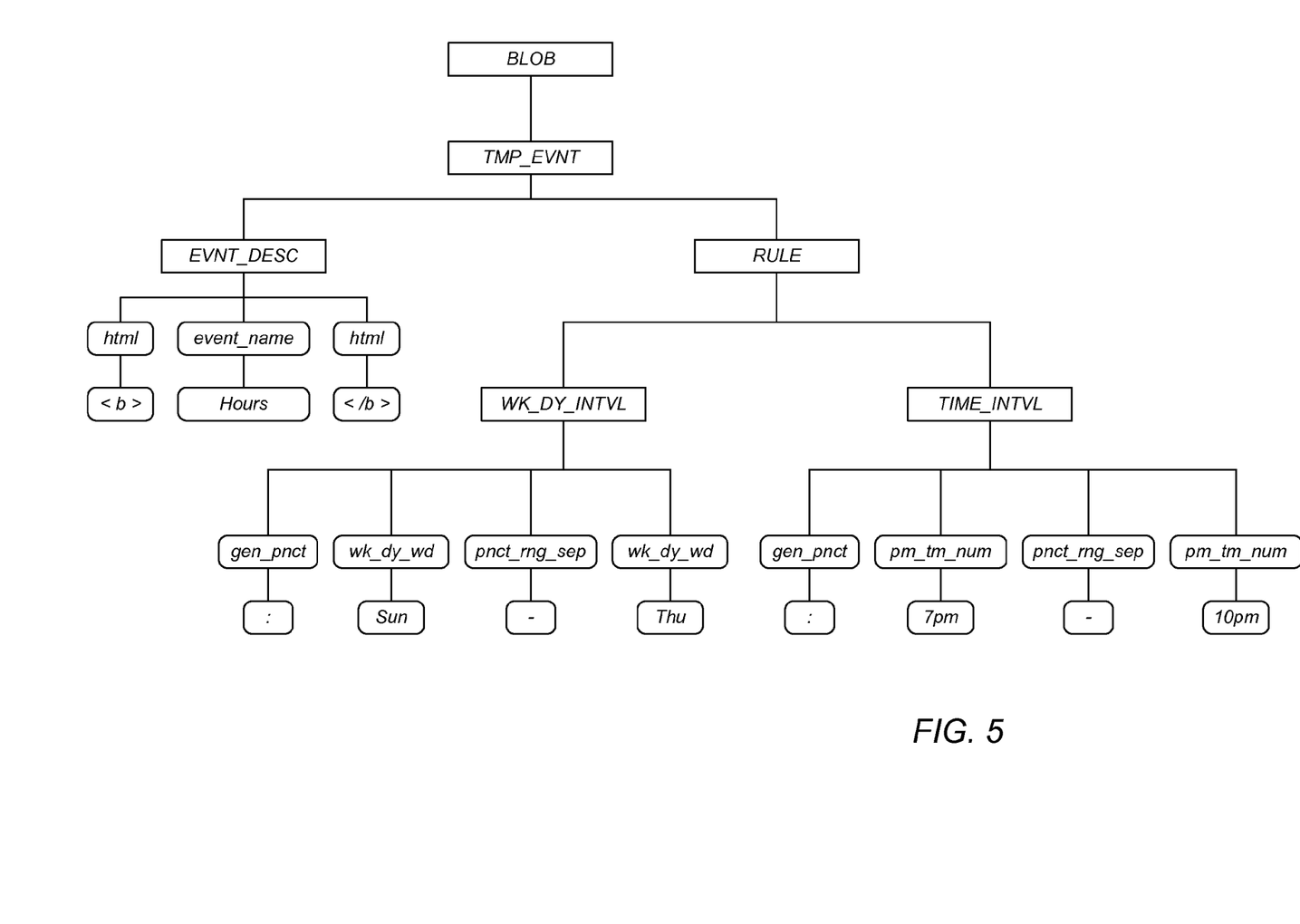
FIG. 5 is a diagram illustrating an example parse tree that has been generated from a sequence of tokens and the corresponding terminal labels in accordance with various embodiments.

FIG. 5 is a diagram illustrating an example parse tree that may be generated from a labeled token sequence such as that described above with reference to FIG. 4 in accordance with various embodiments. As shown in this example, the intermediate node at the first level of the parse tree denotes a temporal event (TMP_EVNT), which is further defined by two internal nodes at the second level of the parse tree, which denote the name of the temporal event or event description (EVNT_DESC) and a time-rule (RULE). The time-rule entity is made up of two time intervals, which are identified at further internal nodes as a weekday interval (WK_DY_INTVL) and a time interval (TIME_INTVL). Each of the intervals may be separately defined by a time period entity.

As shown in this example, the support word, "Hours" of the concept sequence serves as the event name (event-name) for the event description (EVNT_DESC). The weekday interval (WK_DY_INTVL) is defined by the weekday words Sun and Thu and the punctuation range separator "-." Similarly, the time interval (TIME_INTVL) is defined by the times 7 pm and 10 pm, as well as the punctuation range separator "-." The weekday interval (WK_DY_INTVL) is separated from the time interval (TIME_INTVL) by general punctuation (gen_pnct).

The PCFG-based method for generating a parse tree of temporal data has the advantage of being highly flexible. In accordance with various embodiments, the grammar production rules and the associated probabilities may be obtained, at least in part, using editorial annotations.

An alternative solution is to divide the problem of parse tree creation into multiple sub-problems that can be solved with little editorial expertise. Multi-level hierarchical parsing is one such technique. As in the case of the PCFG-based method, the first step is to parse a sequence of text into tokens and assign terminal labels to the tokens as shown and described with reference to FIG. 4. The key difference is in the next steps. The terminal labels may be represented by one or more sets of different hierarchical levels based upon the complexity of the temporal concept being represented by the terminal labels. The terminal labels (e.g., day_of_the_week) may be assumed to be of the lowest level (level 1) of a parse tree, while more complex temporal concepts may be represented at higher levels of the parse tree. For example, a week_day_range that consists of a staring and ending day_of_the_week, along with a separator, may be represented at level 2 of the parse tree. This approach may therefore be applied in a bottom-up fashion. More particularly, a level-specific sequential classification may be applied to the labeled token(s) starting from the lowest level. At each upper level, the input may be the sequence of labels or labeled tokens at the immediately lower level. The sequential classification may include assigning an intermediate label at an immediately higher level to a contiguous sequence of one or more input labels from an immediately lower level. For example, a subsequence day-of-week punct_range_separator day_of_week from level 1 might be labeled as week_day_range at level 2. This sequential classification step may be repeated at each upper level to generate a hierarchy (e.g., parse tree) of temporal labels (e.g., terminal labels and temporal concept labels).

The sequential classification step at each level can be performed using a variety of techniques. One approach to sequential classification is to apply grammar production rules such as those illustrated in FIG. 6. Grammar production rules may be provided by an editor, which could be probabilistic or deterministic. Other approaches to sequential classification include sequential classifiers based on conditional random fields, as discussed in the chapter entitled "An Introduction to Conditional Random Fields for Relational Learning," of the book "Introduction to Statistical Relational Learning," Charles Sutton and Andrew McCallum, edited by Lise Getoor and Ben Taskar. MIT Press. 2006. This book chapter is also available at http://www.cs.umass.edu/~mccallum/papers/crf-tutorial.pdf. Still other approaches to sequential classification include support vector machines that could be trained with editorial annotations on each level, as discussed in "Learning to Classify Text Using Support Vector Machines," by Thorsten Joachims. Kluwer Academic Publishers/Springer, May 2002, ISBN 0-7923-7679-X. This book is also available at http://www.cs.cornell.edu/People/tj/svmtcatbook/.

Grammar production rules may be implemented using various techniques. FIG. 6 is a diagram illustrating example grammar production rules that may be applied to generate a parse tree in accordance with various embodiments. As shown in this example, the grammar production rules may define a time entity and corresponding time range, a day entity and corresponding day range, an event and time association, or day event time expression.

In accordance with various embodiments, one or more grammar production rules may be applied to various segments of text that have been classified (or corresponding tokens) to label one or more intermediate nodes of a parse tree with one or more non-terminal labels identifying one or more temporal entities conforming to a schema such as that described above with reference to FIG. 3. Furthermore, as described above, the grammar production rules may be further applied to intermediate nodes of the parse tree to label intermediate nodes at upper levels of the parse tree. The grammar production rules may be specified editorially or may be automatically determined via a machine learning approach.

Generation of Structured Data from Parse Tree

The labeled parse tree may be traversed in a top-down or bottom-up fashion to populate the various property fields of a temporal event entity (e.g., instance of a temporal event rule) associated with the blob. In the process, one might encounter nodes describing a sub-event, a time rule, time stamp, or time period, which results in the creation of new time related entities of the appropriate type (e.g., by instantiating the pertinent rule type). In particular, a phrase describing a time rule (e.g., Mon-Thu 8 am-2 pm and 7 pm-9 pm) has to be further partitioned to identify the different nesting levels in order to instantiate the correct rule entity. Often, only partial information of the fields (e.g., start/end time) is available and the other properties such as periodicity and applicability may be either set to null or inferred using default logical schematic entities.

Figure 7:
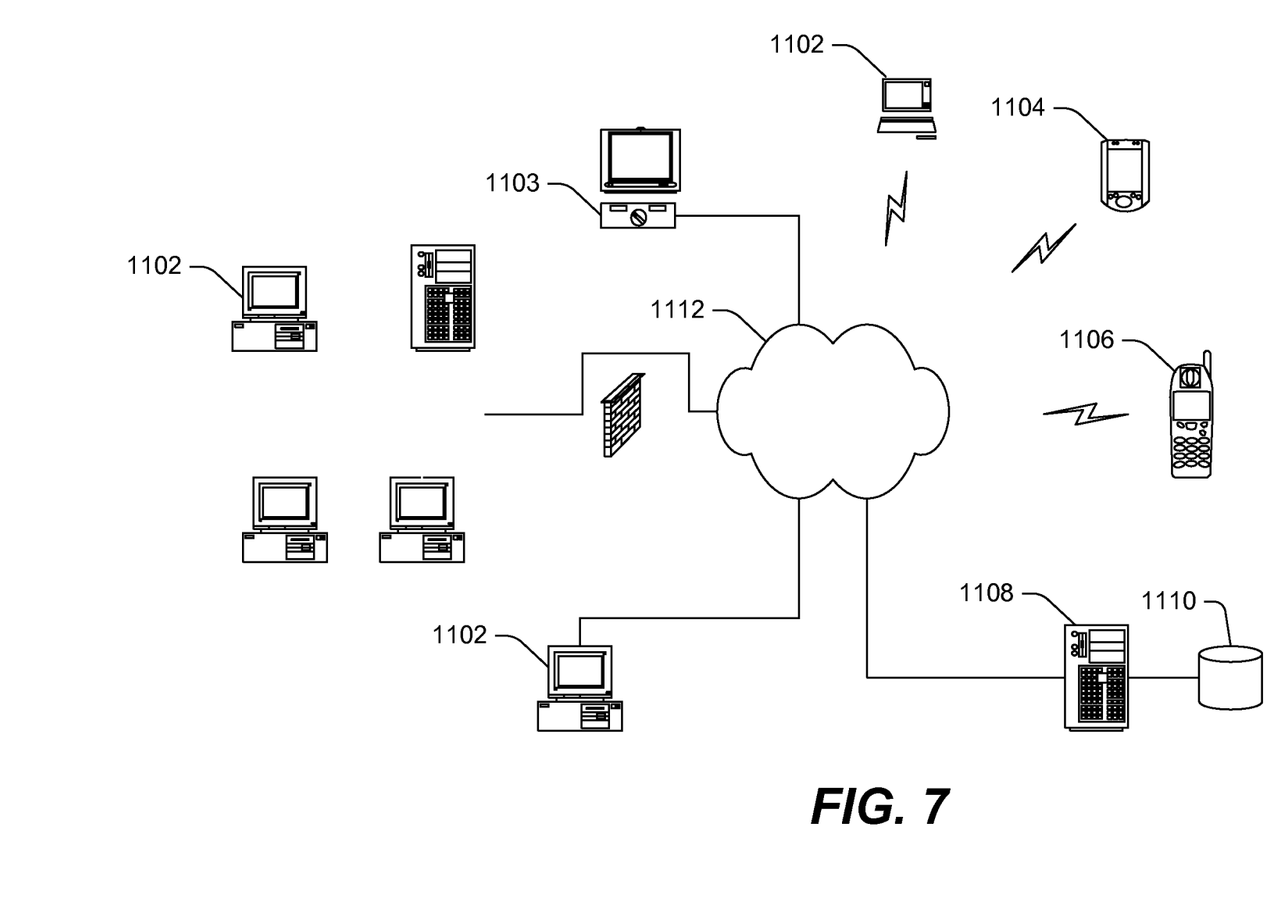
FIG. 7 is a simplified diagram of an example network environment in which various embodiments may be implemented.

The disclosed embodiments may be implemented in any of a wide variety of computing contexts. For example, as illustrated in FIG. 7, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform.

And according to various embodiments, input that is processed in accordance with the invention may be obtained using a wide variety of techniques. For example, a search query may be obtained via a graphical user interface from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

Temporal information may be provided according to the disclosed embodiments in some centralized manner. This is represented in FIG. 7 by server 1108 and data store 1110 which, as will be understood, may correspond to multiple distributed devices and data stores. The invention may also be practiced in a wide variety of network environments (represented by network 1112) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, categories or content types to be displayed in association with the disclosed methods, search results, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
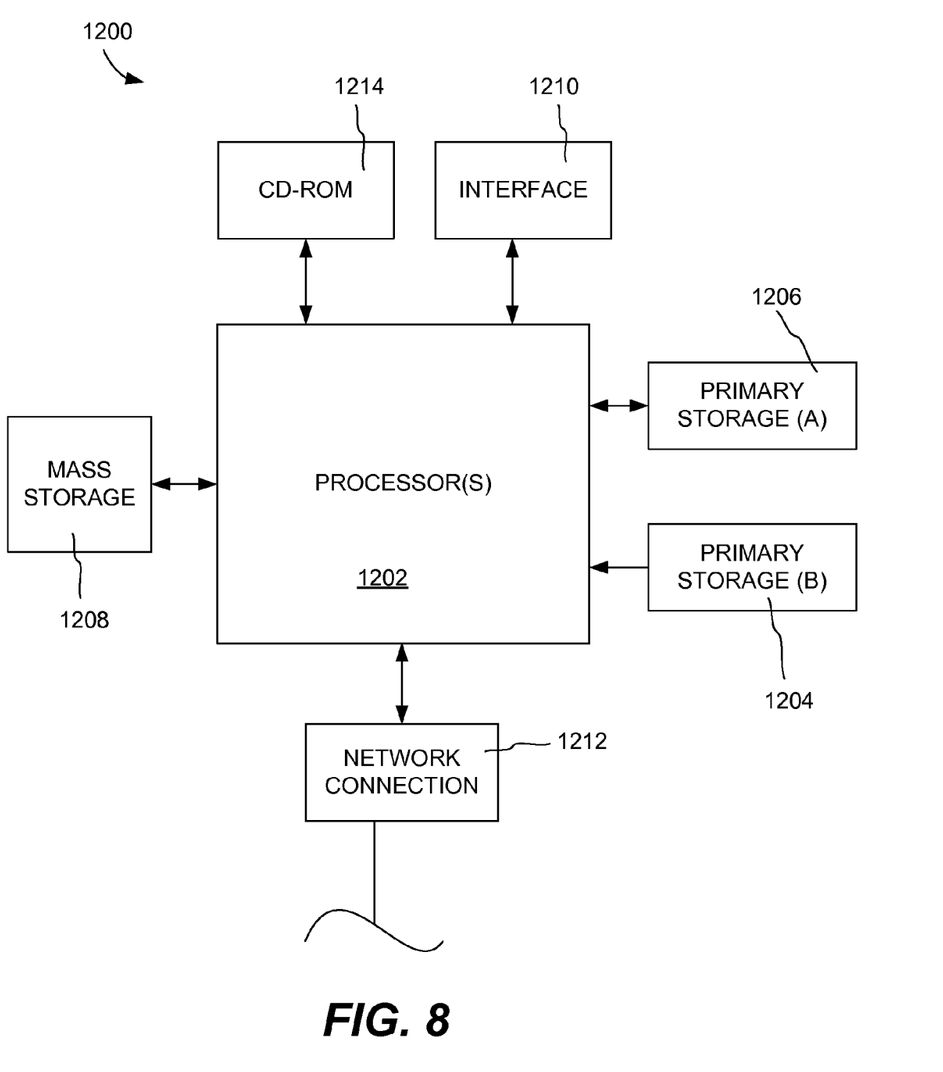
FIG. 8 illustrates an example computer system in which various embodiments may be implemented.

FIG. 8 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A computer-implemented method, comprising:
    obtaining text from a file or website;
    assigning a label to one or more of a plurality of segments of the text such that each of the one or more of the plurality of segments of the text is classified as temporal data in one of a plurality of classes of temporal data; and
    applying by a processor one or more rules to the one or more segments of the text that have been classified as temporal data to generate a structured representation of the temporal data;
    wherein the one or more rules include one or more schematic rules, wherein each of the schematic rules pertains to one or more of the plurality of classes of temporal data and indicates a structure in which temporal data in the corresponding one or more of the plurality of classes is to be stored.

2. The method as recited in claim 1, wherein assigning a label to one or more of a plurality of segments of the text comprises:
    parsing the text into a sequence of a plurality of tokens; and
    assigning a label to one or more of the plurality of tokens, wherein the label assigned to the one or more of the plurality of tokens classifies the corresponding one or more of the plurality of tokens as temporal data in one of the plurality of classes of temporal data.

3. The method as recited in claim 2, further comprising:
    eliminating one or more of the plurality of tokens that cannot be classified as one of the plurality of classes of temporal data.

4. The method as recited in claim 2, wherein assigning a label to one or more of the plurality of tokens comprises:
    assigning a terminal label to one or more of the plurality of tokens, wherein the terminal label assigned to the one or more of the plurality of tokens classifies the corresponding one or more tokens as temporal data in one of the plurality of classes of temporal data, wherein the one of the plurality of classes of temporal data corresponds to a set of tokens that defines the corresponding one of the plurality of classes of temporal data, and wherein assigning a label to the one or more of the plurality of tokens comprises identifying the one of the plurality of classes of temporal data that includes the corresponding one of the plurality of tokens.

5. The method as recited in claim 2, wherein applying one or more schematic rules to the one or more segments of the text that have been classified as temporal data comprises:
    creating a parse tree including the one or more of the plurality of tokens that have been classified as temporal data; and
    traversing the parse tree to convert the temporal data in the parse tree into the structured representation of the temporal data.

6. The method as recited in claim 2, wherein applying one or more schematic rules to the one or more segments of the text that have been classified as temporal data comprises:
    applying the one or more schematic rules to the one or more of the plurality of tokens that have been classified as temporal data.

7. The method as recited in claim 2, wherein assigning a label to one or more of the plurality of tokens is based, at least in part, upon a context of the one or more of the plurality of tokens within the text.

8. The method as recited in claim 1, further comprising:
creating a parse tree including the one or more of the plurality of segments of the text that have been classified; and
traversing the parse tree to convert the temporal data in the parse tree into the structured representation of the temporal data.

9. The method as recited in claim 8, further comprising:
forming a cumulative doubt score using incompletely formed terminal and non-terminal labels of the parse tree; and
rejecting the structured representation of the temporal data if the doubt score is above a specified threshold.

10. The method as recited in claim 8, wherein the one or more rules further include one or more grammar production rules, wherein creating a parse tree comprises applying the one or more grammar production rules to the one or more of the plurality of segments of the text that have been classified to label one or more intermediate nodes of the parse tree with one or more non-terminal labels representing one or more temporal entities conforming to the schematic rules.

11. The method as recited in claim 1, wherein the structured representation associates the temporal data with an entity, the method further comprising
retrieving the temporal data associated with the entity from the structured representation or any of its transformations; and
providing the temporal data.

12. The method as recited in claim 1, further comprising:
associating the temporal data with a business entity or event.

13. A non-transitory computer-readable medium storing thereon computer-readable instructions for causing a processor to perform the following steps:
extracting text from a website;
assigning a label to one or more of a plurality of segments of the text such that each of the one or more of the plurality of segments of the text is classified as temporal data in one of a plurality of classes of temporal data; and
applying one or more rules to the one or more segments of the text that have been classified as temporal data to generate a structured representation of the temporal data;
wherein the rules include one or more schematic rules, wherein each of the schematic rules pertains to one or more of the plurality of classes of temporal data and indicates a structure in which temporal data in the corresponding one or more of the plurality of classes is to be stored.

14. The non-transitory computer-readable medium as recited in claim 13, wherein the plurality of classes of temporal data include at least one of a time of day, a day of the week, a range separator, or a qualifier.

15. The non-transitory computer-readable medium as recited in claim 13, wherein the one or more schematic rules include at least one of a time-period rule pertaining to a time period or a time-stamp rule pertaining to a specific time.

16. An apparatus, comprising:
a processor; and
a memory, at least one of the processor or the memory being adapted for:
obtaining text from a file or website;
assigning a label to one or more of a plurality of segments of the text such that each of the one or more of the plurality of segments of the text is classified as temporal data in one of a plurality of classes of temporal data; and
applying one or more rules to the one or more segments of the text that have been classified as temporal data to generate a structured representation of the temporal data such that the temporal data is associated with an entity;
wherein the rules include one or more schematic rules, wherein each of the schematic rules pertains to one or more of the plurality of classes of temporal data and indicates a structure in which temporal data in the corresponding one or more of the plurality of classes is to be stored.

17. The apparatus as recited in claim 16, at least one of the processor or the memory being further adapted for:
storing the structured representation; and
retrieving the temporal data from the structured representation.

18. The apparatus as recited in claim 16, wherein the one or more schematic rules include one or more positive time-rule entities which describe time periods pertaining to the entity.

19. The apparatus as recited in claim 16, wherein the one or more schematic rules include one or more negative time-rule entities which describe time periods that do not pertain to the entity.

20. The apparatus as recited in claim 16, wherein applying one or more schematic rules comprises:
applying one or more nested schematic entities such that a first one of the one or more schematic entities is applied to temporal data satisfying a second one of the one or more schematic entities.

21. The apparatus as recited in claim 16, wherein applying one or more schematic rules comprises:
instantiating the one or more schematic rules to generate at least a portion of the structured representation.

22. The apparatus as recited in claim 16, wherein the entity is identified in a web site or web page from which the text was obtained.

23. The apparatus as recited in claim 16, at least one of the processor or the memory being further adapted for:
assigning a label to a second set of one or more of a plurality of segments of the text such that each of the second set of one or more of the plurality of segments of the text is not classified as temporal data in one of the plurality of classes.

\* \* \* \* \*